United States Patent [19]

Adolph

[11] 4,168,894
[45] Sep. 25, 1979

[54] ARRANGEMENT FOR PHOTOGRAPHIC DATA MARKING

[75] Inventor: Peter Adolph, Adlikon, Switzerland

[73] Assignee: Contraves AG, Zürich, Switzerland

[21] Appl. No.: 834,816

[22] Filed: Sep. 19, 1977

[30] Foreign Application Priority Data

Oct. 28, 1976 [CH] Switzerland ............ 13596/76

[51] Int. Cl.² ........................................... G03B 17/24
[52] U.S. Cl. ................................... 354/105; 354/109
[58] Field of Search ............................... 354/105, 109

[56] References Cited

U.S. PATENT DOCUMENTS

| | | | |
|---|---|---|---|
| 3,973,130 | 8/1976 | Ameniya | 354/105 |
| 4,001,846 | 1/1977 | Kauneckas | 354/105 |
| 4,053,909 | 10/1977 | Shinoda et al. | 354/105 |
| 4,079,388 | 3/1978 | Takahama et al. | 354/105 |

Primary Examiner—Russell E. Adams
Attorney, Agent, or Firm—Werner W. Kleeman

[57] ABSTRACT

An arrangement for photographic data marking upon a film strip passing through a photographic camera, especially a high-speed theodolite camera, while utilizing a perforated mask and luminescent diodes carried by a substrate. In accordance with the invention, the arrangement is structured as an integrated component which contains at least the substrate, the semiconductor bodies of the luminescent diodes, the perforated mask and a transparent cover plate. The perforated mask is fixedly connected at the side confronting the film strip with the inner side or face of the cover plate. The semiconductor bodies which are electrically connected by electrical connections with one another and with the substrate are arranged at a slight spacing from the other side or face of the perforated mask.

2 Claims, 1 Drawing Figure

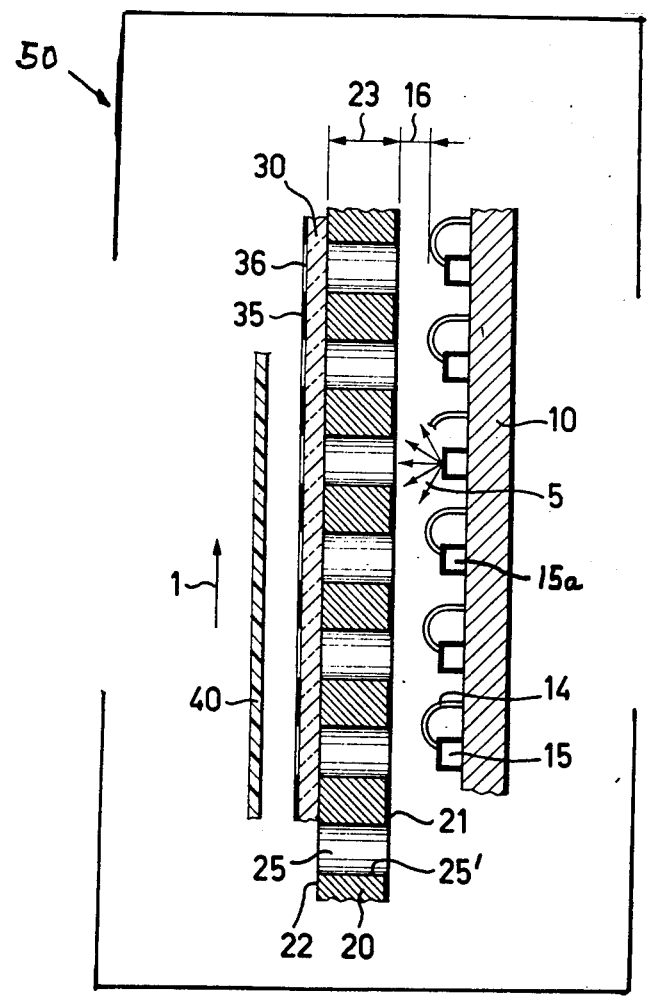

ARRANGEMENT FOR PHOTOGRAPHIC DATA MARKING

BACKGROUND OF THE INVENTION

The present invention relates to a new and improved construction of an arrangement for the photographic data marking upon a film strip passing through a photographic camera, especially in a high speed-theodolite camera, while utilizing a perforated mask and luminescent diodes supported by a substrate.

There is known to the art from German Patent Publication No. 1,623,385, a method and apparatus for the photographic recordal of data upon a film strip of a stepwise registering serial photographic camera. This camera is equipped with a marking device having two pulse light sources which can be actuated by photoconductors, there also being provided appropriately arranged openings which can be illuminated by the light sources. By means of the marking device there is recorded in the lengthwise direction of the film strip, upon such film strip during the feed or transport movement thereof, the switching states detected in succession at the outputs of an electronic storage in addition to the photographic image or photograph which has been taken and thereafter evaluated in an appropriate evaluation device. This method and the apparatus for the performance thereof possesses a limited field of application and is exclusively suitable for use with relatively slow, continuous film feed movements which can be controlled extremely well.

In the case of a generally described high speed-theodolite camera, there is proposed to use for the data marking a grid of glow discharge tubes. This glow discharge tube-grid possesses a correspondingly large construction in order to detect a sufficient amount of data and due to the spatial requirements is arranged at a certain distance with regard to the film, so that the data must be fed in by means of additional optical aids, such as mirrors, lenses or the like, to the film strip. Additionally, glow discharge tubes have a long reaction time, are quite prone to disturbances and, owing to the high rejection rate, require a continuous and expensive control.

SUMMARY OF THE INVENTION

Hence, with the foregoing in mind it is a primary object of the present invention to provide an improved arrangement for photographic data marking which is not associated with the aforementioned limitations and drawbacks of the prior art proposals.

Another and more specific object of the present invention aims at photographically marking a film strip which passes through intermittently at high image frequency with a multiplicity of coded data which is simultaneously correlated to a target image fixed on the film, application of the data being accomplished within or, however, directly at the region of a high-performance camera within a very narrow space and while retaining the exact boundary and positioning of the light spot.

Now in order to implement these and still further objects of the invention, which will become more readily apparent as the description proceeds, the aforementioned arrangement is constructed as an integrated component which contains at least the substrate, the semiconductor bodies of the luminescent diodes, the perforated mask and a transparent cover plate. The perforated mask is fixedly connected at its one face or side which confronts the film strip with the inner side of the cover plate. Furthermore, the semiconductor bodies of the luminescent diodes which are interconnected with one another by means of electrical connections as well as with the substrate are arranged at a small spacing from the other side or face of the perforated mask.

In contrast to the heretofore known devices, such as the aforementioned glow discharge tube-grid arrangement with optically reduced imaging, the inventive arrangement has the advantage of utilizing the essentially known components, such as a perforated diaphragm or glass mask. While resorting to the aid of the proven hybrid technology of the semiconductor art with optimum packing density of the semiconductor bodies of the luminescent diodes which are secured to the substrate, the arrangement constitutes a novel system in a scale of 1:1 which can be dispositioned at the direct region of the film, so that due to the relatively small dimensions there is present the strived for possibility of mounting the arrangement for the photographic data marking in a housing containing an inert gas and constructed as a film stage. The housing can be assembled and disassembled at a correspondingly modified front side of the camera.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates, on an enlarged scale and in sectional view, an arrangement for the photographic data marking as contemplated by the invention.

DETAILED DESCRIPTION OF THE PREFERRED EMBODIMENTS

Describing now the drawing, it is to be understood that the arrangement for photographic data marking as contemplated by the invention, and as will be discussed more fully hereinafter, can be dispositioned in a suitable and thus schematically illustrated housing, only part of which has been shown, and generally indicated by reference character 50. Such housing 50 is filled with an inert gas and hermetically sealed. Now the arrangement for the photographic data marking as contemplated by the invention essentially comprises a substrate 10, the semiconductor bodies 15 of standard luminescent diodes 15a, a perforated diaphragm or mask 20 having the openings or perforations 25, a glass mask 30 provided with a coating 35 and a film strip 40 driven by standard feed means so as to intermittently pass in front of the aforementioned arrangement in the direction of the arrow 1.

The substrate 10 having secured thereat and in spaced relationship from one another the semiconductor bodies 15 of the luminescent diodes 15a which are arranged in rows and columns and interconnected by electrical connections or bond wires 14 with one another as well as with the substrate 10, collectively form the actual light sources. By suitably controlling the time course of the semiconductor bodies 15 there is achieved the result that the number of electrical connections at the substrate 10 and thus the number of control elements can be maintained small and thus equally the spatial requirements of the connection portions likewise can be constructed to be correspondingly small. The control means for activating the luminescent diodes 15a is not part of the subject matter of the invention and therefore need not be here further considered because firing controls suitable for the purposes of the invention are well known in the art.

The perforated diaphragm or mask 20 is arranged in spaced relationship from the substrate 10, and tests have shown that this spacing or distance 16 between the surface 21 of the perforated mask or diaphragm 20 and the electrical connections or wire bonds 14 preferably is of the order of magnitude between 0.2 to 0.6 mm.

Further advantages can be realized by appropriately treating the surface 21 confronting the semiconductor bodies 15 and the inner surfaces 25' of the cylindrically formed perforations or openings 25 so as to be light-absorbing. This treatment prevents, on the one hand, a reflection of the light rays 5, and, on the other hand, to avoid refraction of the light rays of neighboring light beams within the perforations or openings 25. As concerns the foregoing the thickness 23 of the perforated mask or diaphragm also has an appreciable influence and therefore must be appropriately dimensioned.

Now at the other side or face 22 of the perforated mask or diaphragm 20, which face 22 is opposite the inner face or surface 21 which confronts the luminescent diodes 15a, there is arranged the glass mask 30 having a coating 35 at the side or face which confronts the film strip 40. This coating 35 preferably consists of a wear-resistant, reflection-reducing, at least two-layer, preferably multi-layer vapor-deposited coating which enables both cleaning as well as contact of the film in the event of possible film rupture, without in any way damaging the glass mask 30 or the film 40. The coating 35, which is equipped with openings or windows 36 of rectangular configuration for the passage of light therethrough and which is arranged in rows and columns, is assigned the function of sharply limiting the light spot upon the film strip 40. In order to guarantee the requisite accuracy the glass mask 30 together with the openings 36 are preferably optically aligned with regard to the perforations or openings 25 of the perforated mask or diaphragm 20. The glass mask 30 is adhesively bonded to the perforated diaphragm or mask 20 so as to tightly bear thereagainst in an air-tight fashion.

While there are shown and described present preferred embodiments of the invention it is to be distinctly understood that the invention is not limited thereto but may be otherwise variously embodied and practiced within the scope of the following claims. Accordingly,

What I claim is:

1. An arrangement for photographic data marking upon a film strip passing intermittently through a photographic camera, such as a high-speed theodolite camera, comprising:
    a perforated mask;
    a glass mask;
    luminescent diodes supported by a substrate;
    said arrangement being structured as an integrated component filled with an inert gas and hermetically sealed;
    said arrangement containing at least the substrate, semiconductor bodies of the luminescent diodes, the perforated mask, and the glass mask;
    wherein one side of the perforated mask is fixedly connected with the inside of the glass mask;
    wherein the semiconductor bodies, which are connected with one another by means of electrical lines as well as with the substrate, are arranged at a spacing from the other side of the perforated mask, said spacing is in the order of magnitude of about 0.2 to 0.6 mm;
    said perforated mask possesses openings;
    said other side of the perforated mask confronts the semiconductor bodies of the luminescent diodes; and
    wherein all surfaces defining said openings of the perforated mask possess light-absorbing properties whereby a reflection of the light rays is prevented and a refraction of the light rays of beams within neighboring openings is avoided.

2. The arrangement as defined in claim 1, further comprising:
    a coating equipped with openings confronting window means, in confrontation with the film strip, for passing of light therethrough, for limiting the contour of the light spot emitted by the luminescent diodes, and for reducing the reflection of the light.

* * * * *